(12) United States Patent
Morris et al.

(10) Patent No.: US 6,478,427 B1
(45) Date of Patent: Nov. 12, 2002

(54) CRANE FOR A CAMERA

(75) Inventors: Daniel Morris, Austin; Ronald Sheldon, Smithville; Eric Young, Austin, all of TX (US)

(73) Assignee: Autocue, Inc., New York, NY (US)

( * ) Notice: Subject to any disclaimer, the term of this patent is extended or adjusted under 35 U.S.C. 154(b) by 0 days.

(21) Appl. No.: 09/547,131

(22) Filed: Mar. 31, 2000

Related U.S. Application Data

(60) Provisional application No. 60/127,533, filed on Apr. 2, 1999.

(51) Int. Cl.[7] .......................... G03B 17/00; F16M 13/00
(52) U.S. Cl. .................................. 352/243; 248/123.11
(58) Field of Search ...................... 352/243; 248/123.11, 248/123.2, 125.8, 125.9; 52/118, 634; 212/347, 348, 350; D34/36

(56) References Cited

U.S. PATENT DOCUMENTS

| | | | |
|---|---|---|---|
| 1,645,060 A | * 10/1927 | Kraft ............................ | 52/634 |
| 1,656,810 A | * 1/1928 | Arnstein ....................... | 52/634 |
| 2,073,998 A | * 3/1937 | Raby ............................ | 248/587 |
| 2,156,862 A | 5/1939 | Manguard ................. | 248/123.2 |
| 2,211,088 A | 8/1940 | Arnold ....................... | 396/428 |
| 2,447,667 A | 8/1948 | Raby ....................... | 248/123.2 |
| 2,472,944 A | 6/1949 | Furer et al. ................ | 280/6.15 |
| 2,719,471 A | * 10/1955 | Aspden et al. ............. | 396/428 |
| 2,905,421 A | 9/1959 | O'Connor .................. | 248/636 |
| 2,998,953 A | 9/1961 | O'Connor ................ | 248/183.3 |
| 3,103,257 A | 9/1963 | Richards ..................... | 182/2.8 |
| 3,180,603 A | 4/1965 | O'Connor ................ | 248/183.2 |
| 3,516,343 A | 6/1970 | Tunney ....................... | 396/428 |
| 3,578,347 A | 5/1971 | O'Connor .................. | 277/389 |
| 3,643,345 A | 2/1972 | Wilton et al. ................ | 434/44 |
| D224,978 S | * 10/1972 | Sterner ......................... | D34/36 |
| 3,820,134 A | 6/1974 | Wilton et al. ............... | 396/428 |
| 3,877,041 A | 4/1975 | Graeter et al. .............. | 396/351 |
| 3,917,200 A | 11/1975 | Johnson ....................... | 248/13 |
| 4,003,168 A | * 1/1977 | Brady ........................... | 52/118 |
| 4,168,008 A | * 9/1979 | Granryd ..................... | 212/350 |
| 4,171,598 A | * 10/1979 | Holmes ....................... | 52/118 |
| RE30,905 E | * 4/1982 | Lester et al. .................. | 52/115 |
| 4,344,595 A | 8/1982 | Heller et al. ................ | 248/542 |
| 4,406,375 A | * 9/1983 | Hockensmith ............. | 212/349 |
| 4,655,567 A | 4/1987 | Morley ........................ | 352/243 |
| 4,657,220 A | 4/1987 | Lindsay ....................... | 248/647 |
| 4,779,833 A | 10/1988 | Fletcher et al. ............. | 248/550 |
| 4,849,778 A | 7/1989 | Samuelson .................. | 396/428 |

(List continued on next page.)

Primary Examiner—Russell Adams
Assistant Examiner—Rodney Fuller
(74) Attorney, Agent, or Firm—Leydig, Voit & Mayer, Ltd.

(57) ABSTRACT

An instrument supporting crane for supporting a camera or the like, the crane being readily assembled, disassembled, and shipped. The crane includes a boom to which a nose assembly is pivotably coupled, and a base unit to which the boom is pivotably coupled. The boom is preferably constructed of a series of sections such that the length of the boom may be varied, depending upon the application. The boom sections are coupled by complementary channels such that the section slide together. An additional mechanical coupling, such as a screw may be provided. Preferably, the boom is a hollow elongated structure with openings extending therethrough to allow the passage of air to minimize movement of the nose assembly when the crane is used in high winds. A platform assembly having a monitor tray for supporting a monitor may be provided at a tail section of the boom. The monitor tray may be pivotably coupled to the tail section and the base unit such that the angle of the monitor varies depending upon the relative positions of the tail section and the base unit. The base unit is likewise readily assembled and disassembled. The base unit includes a head, a plurality of legs and a dolly. A center tie-down rod extends between the head and the dolly such that when the rod is shortened, as by tightening a sleeve, the head and dolly are drawn towards one another and a compressive force is placed on the legs to secure the base unit together.

42 Claims, 10 Drawing Sheets

U.S. PATENT DOCUMENTS

| | | |
|---|---|---|
| 4,907,768 A | 3/1990 | Masseron et al. ...... 248/123.11 |
| 4,943,019 A * | 7/1990 | Mester ................. 248/123.11 |
| 4,955,568 A | 9/1990 | O'Connor et al. ....... 248/183.3 |
| 5,033,705 A | 7/1991 | Reagan ................. 248/123.11 |
| 5,054,725 A | 10/1991 | Bucefari et al. ....... 248/123.11 |
| 5,139,220 A | 8/1992 | Leonian ................ 248/123.2 |
| 5,177,516 A | 1/1993 | Fitz et al. ................ 396/428 |
| 5,192,963 A | 3/1993 | Hill ........................... 396/428 |
| 5,531,412 A | 7/1996 | Ho ......................... 248/123.2 |
| 5,644,377 A | 7/1997 | Romanoff et al. .......... 352/243 |
| 5,667,186 A | 9/1997 | Luber et al. ................ 248/550 |
| 5,671,932 A * | 9/1997 | Chapman ................. 280/47.11 |
| 5,683,063 A | 11/1997 | Seiders et al. .............. 248/214 |
| 5,697,757 A * | 12/1997 | Lindsay ................... 414/744.6 |
| 5,835,193 A | 11/1998 | Romanoff et al. .......... 352/243 |
| 5,853,153 A | 12/1998 | Condrey ................. 248/125.2 |
| 5,856,862 A | 1/1999 | Kokush ...................... 352/243 |

* cited by examiner

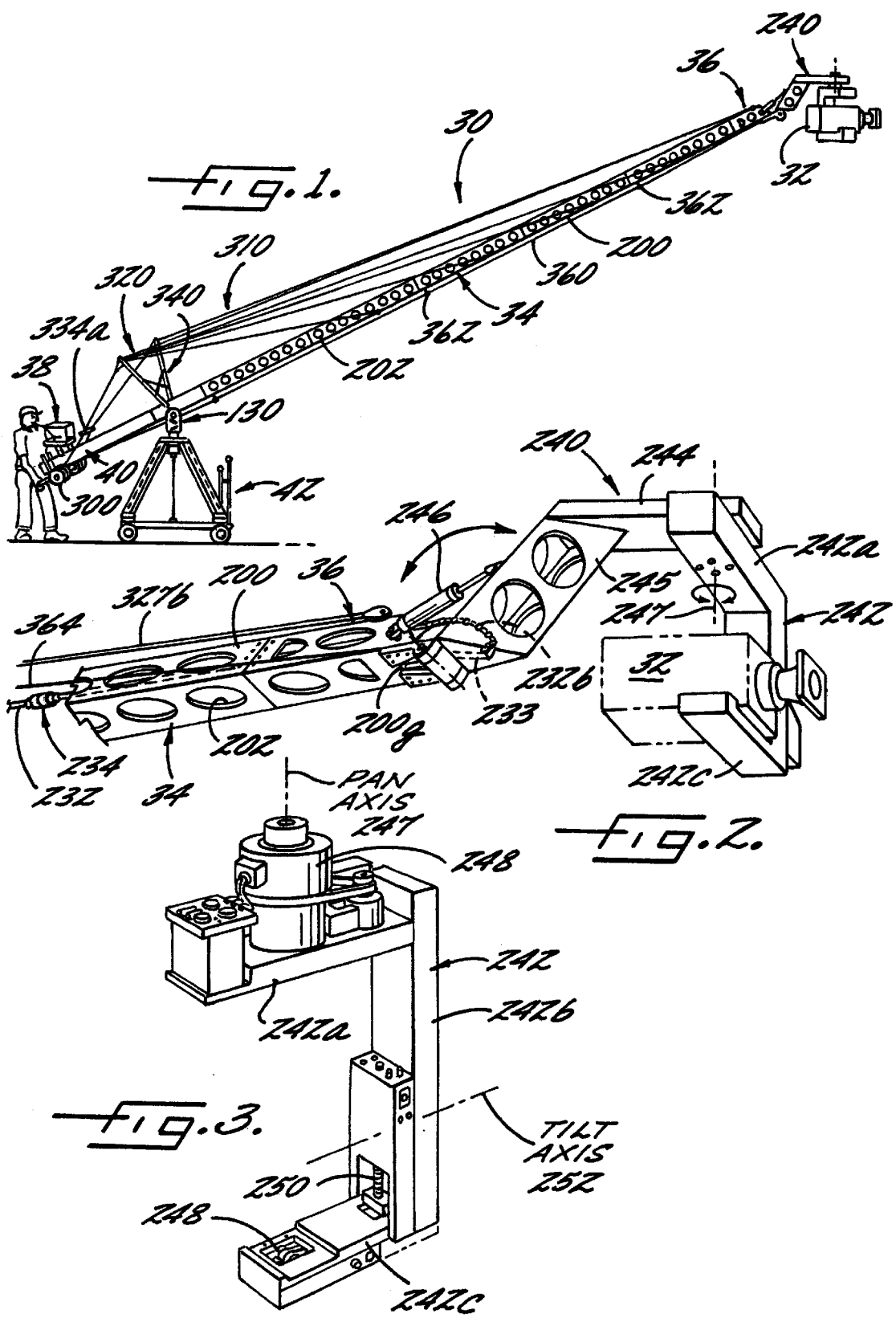

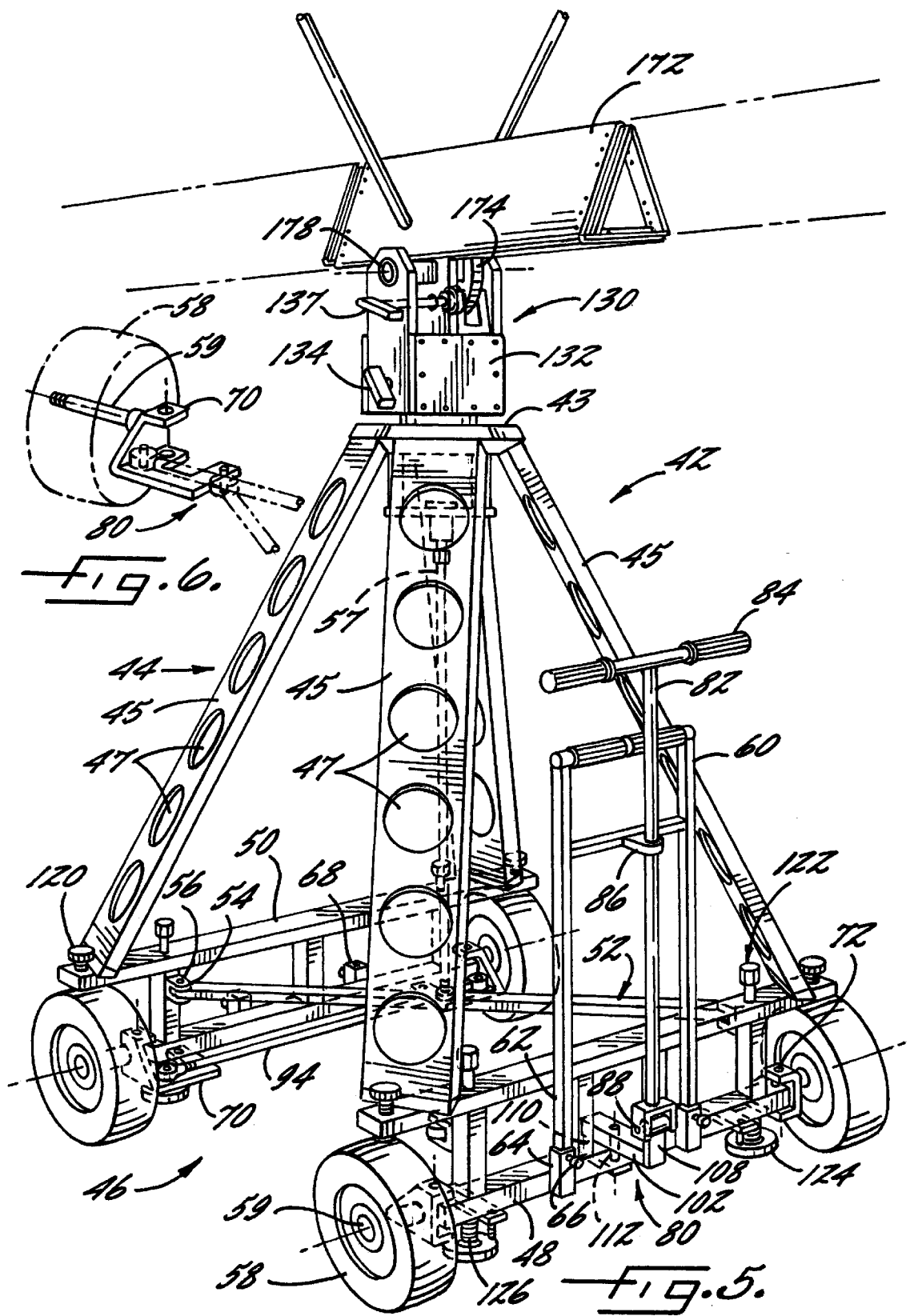

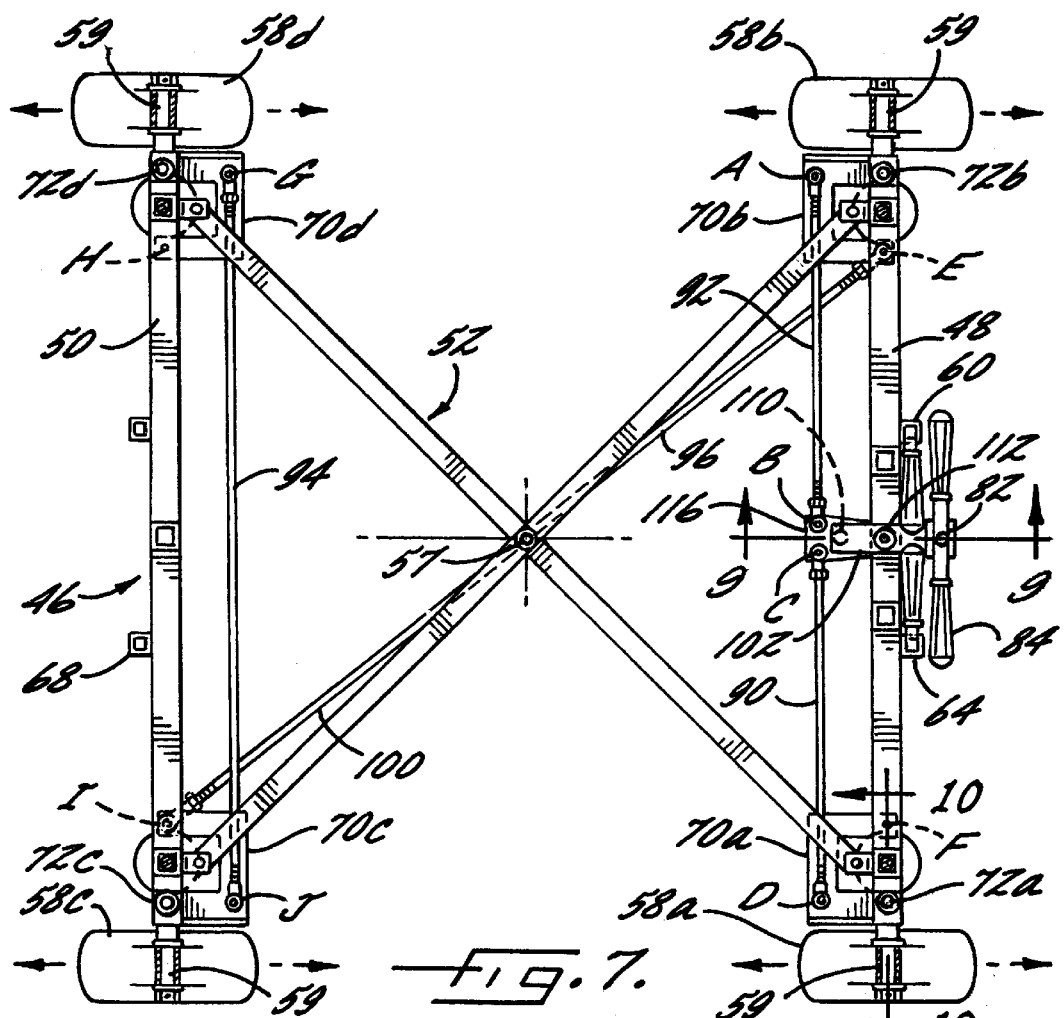

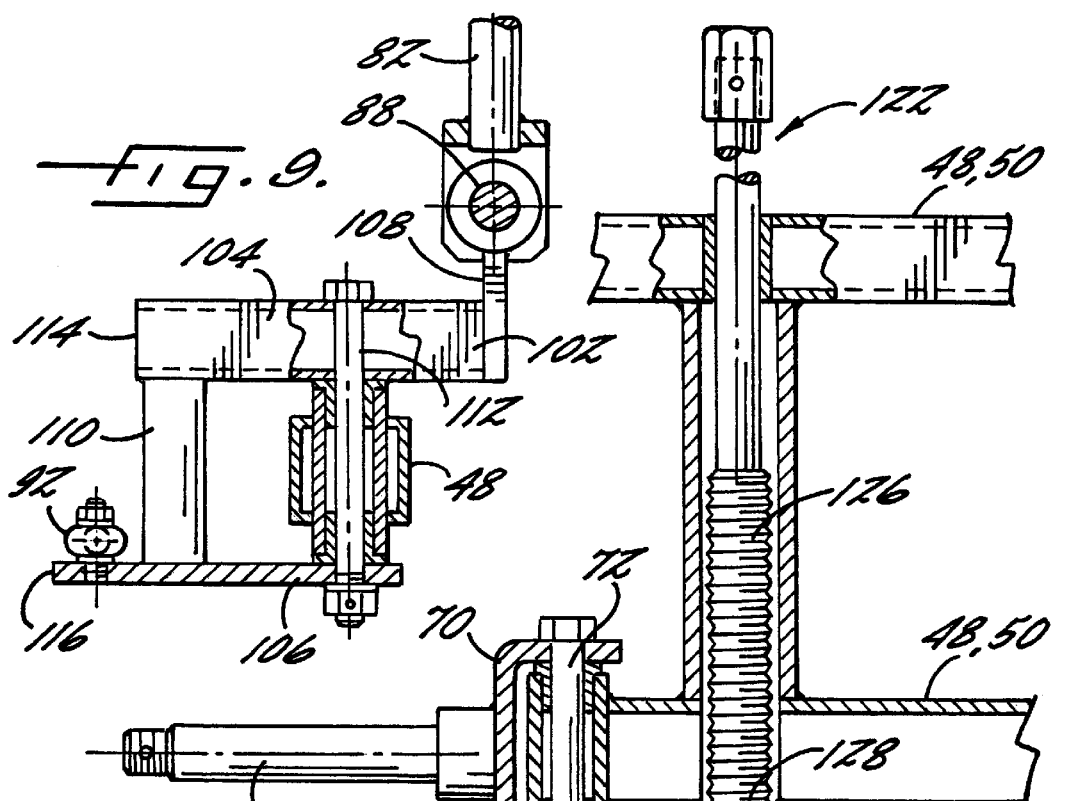
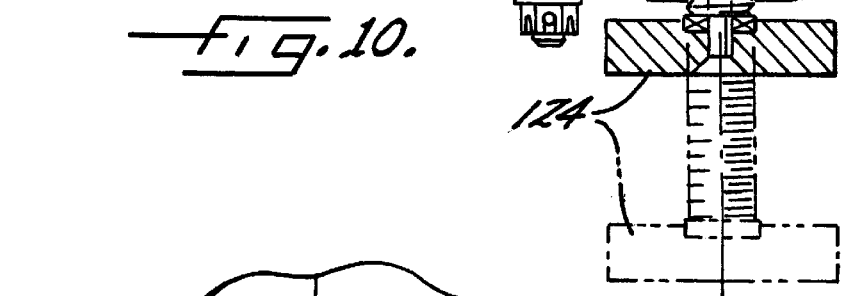

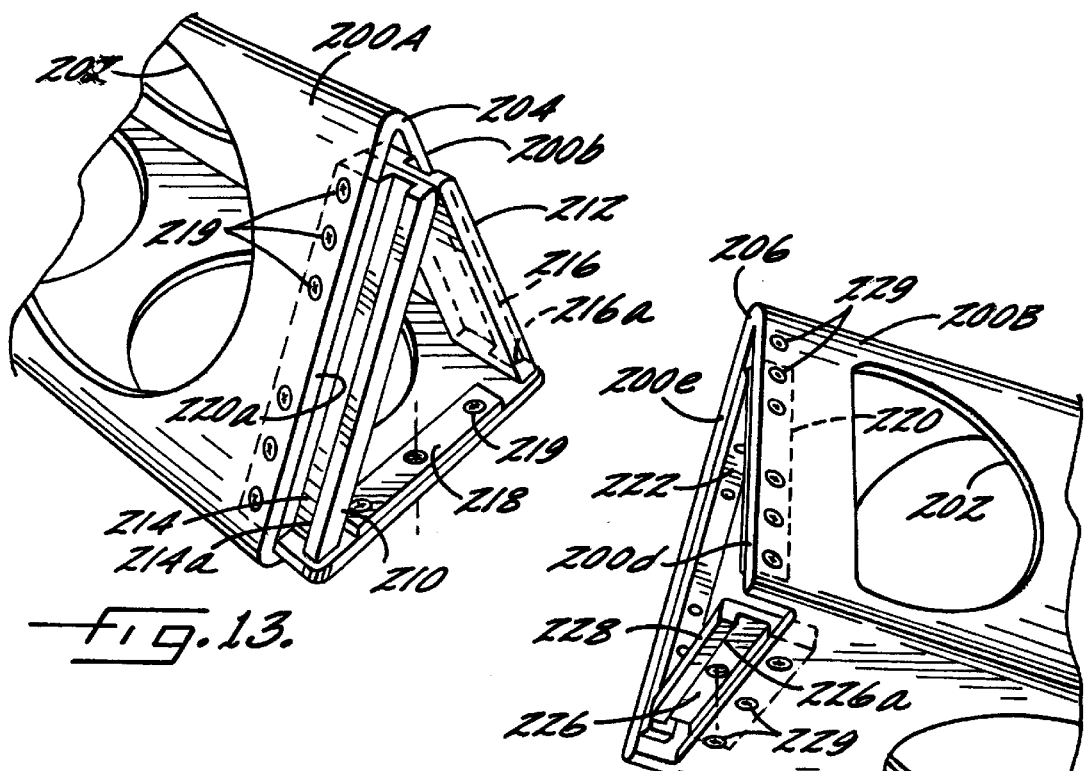
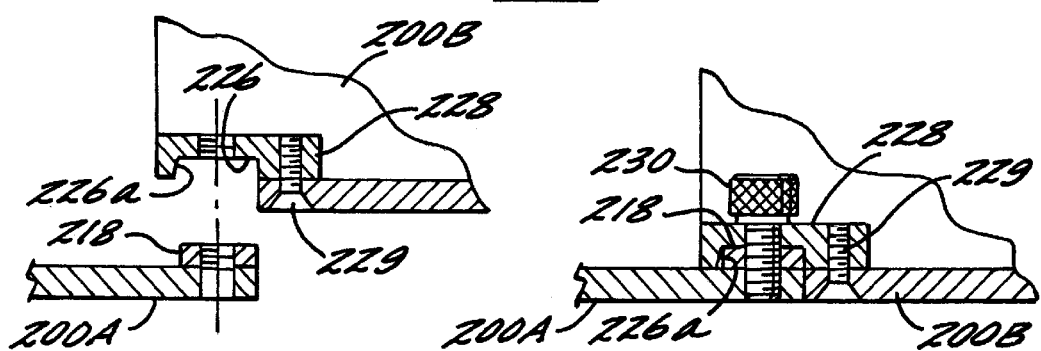

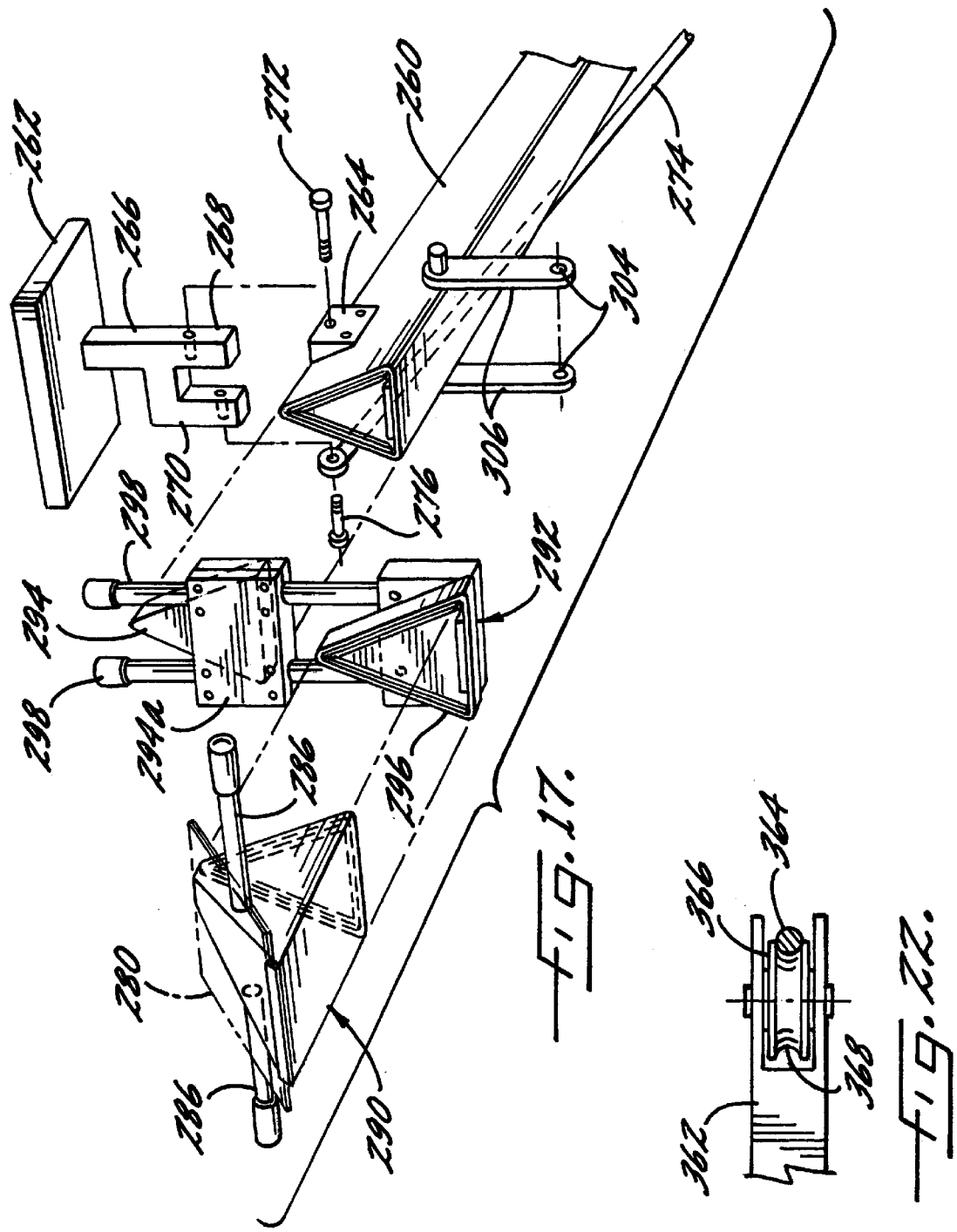

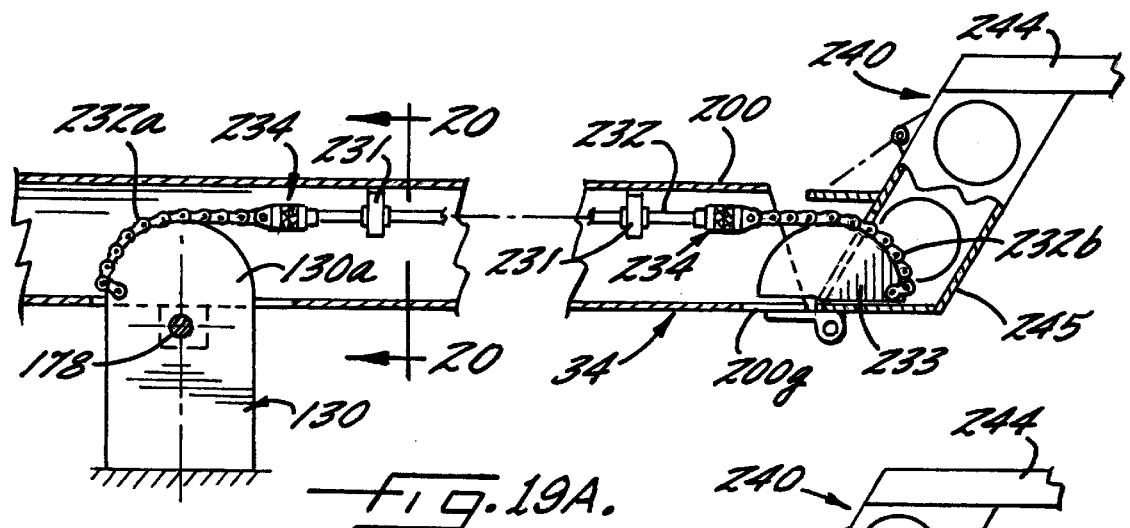
Fig. 19A.
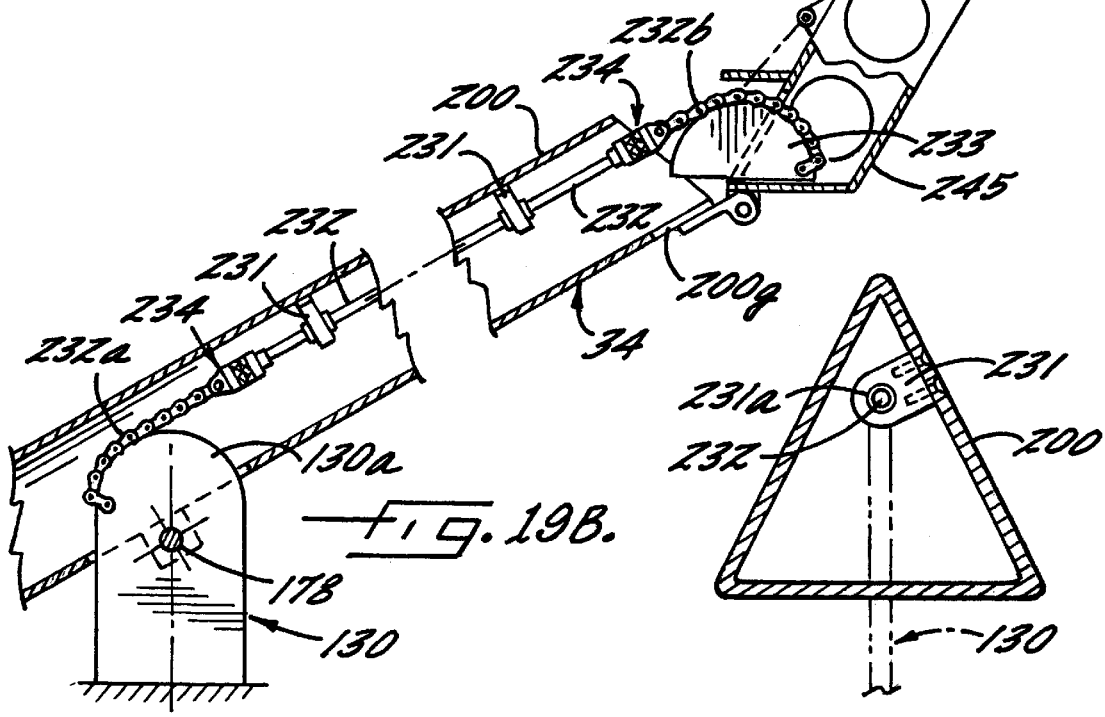
Fig. 19B.
Fig. 20.
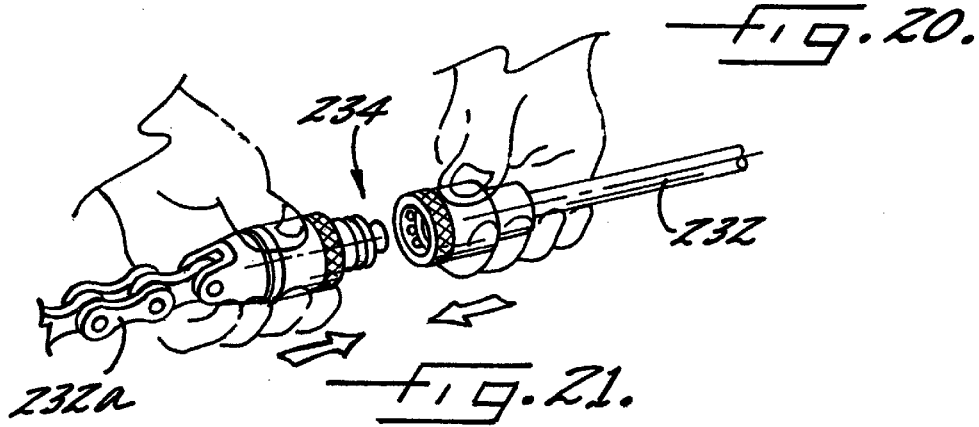
Fig. 21.

CRANE FOR A CAMERA

This application claims the benefit of provisional application No. 60/127,588 filed Apr. 2, 1999.

FIELD OF THE INVENTION

The present invention relates to cranes for supporting camera heads, and, more particularly, to a readily assembled and disassembled crane for supporting a camera head.

BACKGROUND OF THE INVENTION

Supporting systems for cameras used in the filming of motion pictures, television shows, sporting events, award shows and the like, are typically classified into two types, pedestal supports and crane supports. Both types of supports have their advantages and disadvantages. While pedestal supports are often easier to physically move to a new location, they generally have a restricted range motion during filming as the camera is generally rotatably fixed on the pedestal which has restricted movement. Accordingly, crane supports which dispose the camera at the end of a cantilevered boom are often considered more versatile from a film standpoint inasmuch as they offer a range of motion to the supported camera following a curved locus during filming.

Cantilevered cranes for supporting a camera are known in the art (e.g., U.S. Pat. No. 5,033,705 to Reagan and U.S. Pat. No. 5,192,963 to Hill). Some such cranes support both the camera and an operator possibly with an assistant, as shown, for example, in U.S. Pat. No. 2,211,088 to Arnold, U.S. Pat. No. 2,472,944 to Furer, et al., and U.S. Pat. No. 5,683,063 to Seiders et al. Alternately, a camera alone may be coupled to the boom and remotely operated by a camera man disposed, for example, at the proximal end thereof. The camera may be mounted to the distal end of the boom for movement along an arcing path, as shown, for example, in U.S. Pat. No. 2,156,862 to Maugard and U.S. Pat. No. 5,177,516 to Fitz et al., or an arcing and telescoping path as disclosed, for example, in U.S. Pat. No. 4,907,768 to Masseron, et al., and U.S. Pat. No. 4,943,019 to Mester. While some crane supports utilize a simple pivoting motion of the boom about a single point, they typically utilize bulky and relatively complex four-bar linkage arrangements to control the movement of the head supporting the camera at the distal end of the boom (e.g., U.S. Pat. No. 4,657,220 to Lindsay, and U.S. Pat. No. 5,531,412 to Ho).

Although generally relatively large in size, it may be desirable to physically move the location of the crane. Unfortunately, most cantilevered cranes cannot be efficiently moved during camera use without significantly adversely affecting the filmed image. Additionally, most are extremely difficult and time consuming to disassemble and reassemble and, accordingly, cannot be readily transported to different filming locations, increasing production costs and reducing filming flexibility.

In utilizing cantilevered cranes, it is imperative that camera be as stable as possible during movement in order to provide steady and smooth filming. According, it is desirable to minimize any recoil resulting simply from movement of the boom or the crane. Additionally, environmental factors, such as high winds that may be encountered at outdoor events, may likewise affect the quality of the filming provided by a remotely mounted camera. Thus, it is also preferable that the crane be resistant to movement resulting from such environmental factors. Typically, however, cranes which are relatively resistant to these factors are either highly complex in structure, expensive, or extremely heavy and difficult to transport.

A support crane must also maintain the camera in a desired position once determines by the operator. In other words, when the crane is in a desired position, the crane is preferably resistant to drift, or movement from the desired stationary position. In this regard, cranes may include locking mechanisms which physically lock the crane in a desired position. Alternately, if accurately balanced, crane manufacturers may claim that the crane theoretically maintains the remotely mounted camera in a desired position, even without a lock mechanism. Unfortunately, however, the cranes of the prior art typically have fallen short in this regard. Drift is common among support cranes, particularly those more simple designs or those at the lower end of the cost scale.

OBJECTS OF THE INVENTION

Accordingly, it is a primary object of the present invention to provide lightweight crane for supporting and articulating a camera. A more specific object is to provide a crane that may be easily maneuvered, quickly assembled and disassembled, as well as be very stable.

An additional object is to provide a crane that readily maintains a position during use and is resistant to drift. A related object is to provide a crane that is rigid.

A further object is to provide a crane that is may be effectively utilized in various circumstances, indoors and outdoors. A more specific object is to provide a crane that is resistant to high winds or the like.

Another object is to provide a crane with high reliability, which can be economically produced.

Other objects and advantages of the present invention will become apparent as the following description proceeds. While the present invention may be described herein principally in connection supporting cameras, it should be appreciated that this invention is equally applicable to supporting other types of recording devices

SUMMARY OF THE INVENTION

The invention provides a lightweight crane that may be easily maneuvered, quickly assembled and disassembled, and that is very stable. The crane includes a boom that is balanced upon a pivot tower and supports the user controls at one end and the camera at the other. According to an important feature, the crane is balanced such that it will hold substantially any tilt position once the initial balancing is achieved resisting drift and recoil. According to another important feature, the crane is constructed of multiple lightweight components that may be readily broken down and stored in travel. For example, the boom is constructed of extruded aluminum and includes a substantially triangular cross-section. Added support is provided to the nose, which supports the camera at the end of the boom, by a tension rod which runs the length of the boom extending over a pair of arches and coupled at one end to the nose, and at the other to the pivot tower. The cable additionally acts to maintain the nose assembly in a substantially horizontal position. Multiple cable supports preferably supported by support arms add stability to the boom during use.

Additionally, the multiple lightweight components of the boom may be easily assembled and disassembled. In the preferred embodiment, the ends of the boom sections are provided with a cooperative channel structure. The "upper" two sides of the triangular cross-section boom sections are provided with cooperating channels such that gravity assist in assembling the sections. Once seated, a thumb screw, or a screw with a knob is used to couple the "bottom" walls of adjacent components together to secure adjacent components to one another. A similar arrangement is used to couple the operator controls to the proximal end of the boom at the boom extender, which supports the counterweight.

Preferably, the boom includes a plurality of openings which extend into the interior of the hollow boom. Not only do these openings further reduce the weight of the boom, inasmuch as they are staggered about the perimeter of the boom, they maintain the structural integrity and strength of the structure. Additionally, significantly, the inclusion of these openings increases the resistance of the boom, and, accordingly, the camera head, to the effects of high winds.

The boom is supported by a pivot tower on a base unit that includes head supported on a quad pod coupled to a wheeled dolly. The pivot tower includes both horizontal and vertical tilt assemblies for facilitating horizontal and vertical pivotal movement to the boom relative to the head. The legs of the quad pod are coupled to both the head and the dolly by pins which are received in the hollow interior of the legs. The head and the dolly are then coupled together by a quad pod tie down rod which effectively compresses the legs, securing the base unit as a whole.

The dolly includes substantially parallel ladder components to which dolly wheels, levelers, a steering arm and steering linkage are coupled. As a result, the operator may either "crab" or "circle" steer the dolly to appropriately position the camera, either prior to or during usage. The ladder components are coupled together by and "X-shaped" cross brace to which the quad pod tie down rod is tightened to assemble the quad pod legs and head to the dolly. Upon disassembling the ladder components from the cross brace, the cross brace may be scissored to a relatively flat position for storage. The ladder components may be stored with the wheels, feet and steering linkage attached. Thus, the base unit is easily assembled and disassembled for storage and shipment.

Thus, the invention provides a lightweight crane that may be quickly assembled and disassembled for shipment. Due to its open structure, it is highly resistant to drift, as well as movement due to outside environmental forces, such as the wind. The crane provides reliable, lightweight support for articulation of a camera or the like, at an economical cost.

These and other aims, objectives, and features of the invention will become more apparent from the following detailed description when taken in conjunction with the accompanying drawings.

BRIEF DESCRIPTION OF THE DRAWINGS

FIG. 1 is a perspective view of a crane constructed in accordance with teachings of the invention.

FIG. 2 is a fragmentary perspective view of the front nose of the crane of FIG. 1.

FIG. 3 is an enlarged perspective view of the crane head of FIGS. 1 and 2 with some of the covers removed.

FIG. 5 is an enlarged perspective view of the base unit of FIGS. 1 and 4.

FIG. 6 is a perspective view of a bracket and axle which couples a wheel to the dolly of FIGS. 1, 4 and 5.

FIG. 7 is a plan view of the dolly of FIG. 5.

FIG. 8A is a schematic bottom view of the dolly of FIG. 7 shown in the circle steering position.

FIG. 8B is a schematic view of the dolly of FIG. 7 shown in the crab steering position.

FIG. 9 is an enlarged fragmentary, partially broken away view of the steering rod and control taken along line 9—9 in FIG. 7.

FIG. 10 is an enlarged fragmentary, cross-sectional view of the dolly wheel brake taken along line 10—10 in FIG. 7.

FIG. 12 is a fragmentary, cross-sectional view of the tilt brake taken along line 12—12 in FIG. 11.

FIG. 13 is an enlarged, fragmentary perspective view of an end of a section of the boom of FIG. 1.

FIG. 14 is an enlarged, fragmentary perspective view of an end of a section of the boom of FIG. 1, which mates with the section shown in FIG. 13.

FIG. 15 is a fragmentary, perspective view of the ends of the booms shown in FIGS. 13 and 14 sliding together in a mating fashion.

FIG. 16A is an enlarged, fragmentary, perspective view of the mating elements along the lower surfaces of the boom sections of FIGS. 13 and 14, and 15.

FIG. 16B is an enlarged, fragmentary, perspective view similar to that of FIG. 16A showing the mating elements in the engaged position.

FIG. 17 if an enlarged, fragmentary, perspective view of the tail end of the boom, the balcony, and the control tail of FIG. 4.

FIG. 19A is a fragmentary view of the pivot tower, boom, and nose, partially broken away to show the tension rod support assembly.

FIG. 19B is a fragmentary view as shown in FIG. 19A wherein the boom is in a raised position.

FIG. 20 is a cross-sectional view of the boom section taken along line 20—20 in FIG. 19A.

FIG. 21 is a fragmentary perspective view of the quick disconnect coupling shown in FIGS. 19A and 19B.

FIG. 22 is an enlarged fragmentary view of one of the lateral stays.

Figure 4:
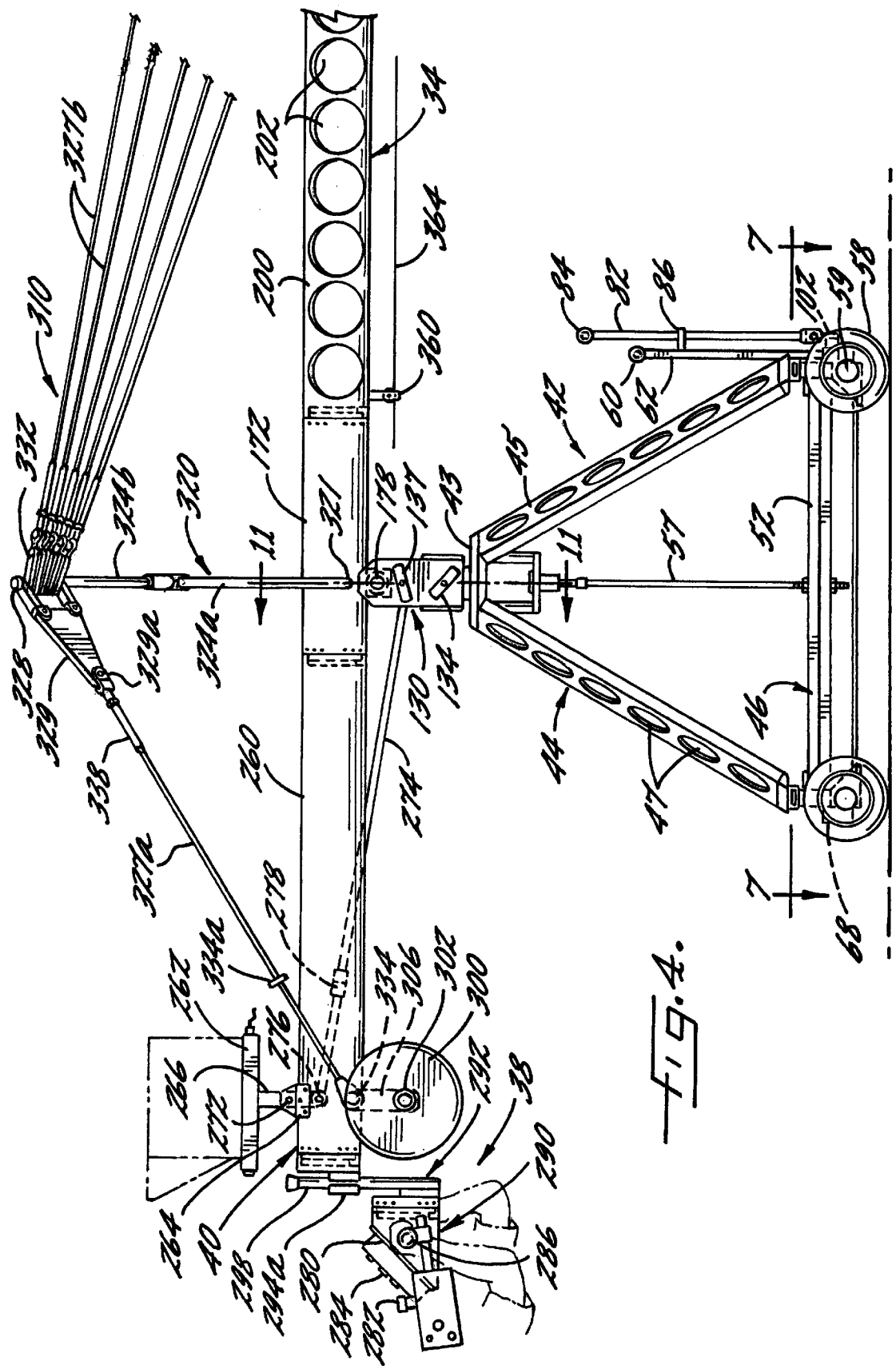
FIG. 4 is a fragmentary side elevational view of the base unit and the tail end of the crane of FIG. 1.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Turning now to the drawings, there is shown in FIG. 1 a crane (shown generally as 30) for supporting a camera 32. The crane 30 includes an elongated boom 34 which supports the camera 32 at the distal end 36 and user controls 38 at the proximal end 40.

In accordance with the invention, the boom 34 is supported on a base unit 42 that may be easily and quickly assembled. As shown in FIGS. 4 and 5, the base unit 42 preferably comprises a quad-pod 44 supported upon a dolly 46. The quad-pod 44 comprises a head 43 supported on a plurality of legs 45 (four such legs in the preferred embodiment illustrated), which are in turn supported on the dolly 46. The legs 45 may be coupled to the head 43 and dolly 46 by any appropriate configuration. In the preferred embodiment, the longitudinally extending hollow interiors 39 of the legs 45 receive pins 41 which extend outwardly from surfaces of the head 43 and dolly 46 (see FIG. 11). It will be appreciated by those skilled in the art that the legs 45 may be of an alternate design. For example, the legs may be of a traditional "V-shaped" dual tubular design. In the embodiment illustrated, the legs 45 have a series of openings 47 therethrough which considerably lighten the physical weight of each leg and, accordingly, the crane 30. (See FIG. 4.)

The dolly 46 includes two ladder components 48, 50, which are disposed in substantially parallel configuration (see FIG. 5). The relative positions of the ladder components 48, 50 are maintained by an "X-shaped" cross brace 52. The cross brace 52 is coupled to the ladder components 48, 50 by "C-shaped" brackets 54 which protrude from a side of each ladder component 48, 50. Pins 56 are inserted through coaxial openings in the brackets 54 and the ends of the cross brace 52.

A quad-pod tie down rod 57 which extends downward from the lower surface of the head 43 to the cross brace 52 may be tightened down in order to secure the quad-pod 44 to the dolly 46. It will be appreciated by those skilled in the art that by so tightening down the tie down rod 57 and drawing the head 43 toward the cross brace 52, a compressive force is exerted on the legs 45. In this way, it is not necessary to separately secure the legs 45 to the head 43 or the legs 45 to the dolly 46.

To provide mobility to the crane 30, wheels 58 are rotatably mounted at opposite ends of each ladder component 48, 50 on axles 59. The base unit 42 may be pushed by way of a stationary, inverted "U-shaped" push bar 60, the downwardly depending ends 62 of which are received in brackets 64 on a ladder component 48. The ends 62 of the push bar 60 are secured to the ladder component 48 by thumb screws 66. Should the user wish to push the base unit 42 from the opposite direction, the push bar 60 may be received by brackets 68 provided on the other ladder component 50, and similarly coupled.

In order to facilitate steering of the base unit 42, the wheels 58 are mounted to the ladder components 48, 50 by dual "C-shaped" brackets 70, which are pivotably mounted to ends of the ladder components 48, 50 by pins 72. (Component identifiers such as 58 and 70 may be designated in FIGS. 7, 8A, and 8B with an associated letter a–d for ease of explanation.) It will thus be appreciated by those skilled in the art that pivoting of a "C-shaped" bracket 70 relative to the respective ladder component pivots the associated wheel 52 relative to the ladder component about pin 72, permitting steering of the base unit 42.

To control pivoting of the wheels 58, steering controls (identified generally as 80) are provided. As best seen in FIGS. 6, 7. 8A and 8B, steering is accomplished by way of a steering arm 82 and steering linkage, which includes a series of tie rods 90, 92, 94, 96, 98, 100. The steering arm 82 is generally "T-shaped," having handles 84 at the upper outwardly extending ends of the "T-shape." A storage bracket 86 may be provided along the push bar 60 to maintain the steering arm 82 in a storage position (as shown in FIG. 5) when not in use.

In order to couple the steering arm 82 to the steering linkage, a steering tongue 102 is provided. In the preferred embodiment shown, the steering tongue 102 includes two substantially horizontal portions 104, 106, and two substantially vertical portions 108, 110, although the design may vary (see FIG. 9). The steering arm 82 is coupled to the steering tongue 102 by way of pin 88 which extends through a bore in vertical component 108. The coupling pin 88 permits the steering arm 82 to pivot about a horizontal axis to provide enhanced comfort and leverage to the user.

The steering tongue 102 is pivotably coupled to the ladder component 48 by rod 112. As shown in FIG. 9, the rod 112 extends through bores in horizontal components 104 and 106 of the steering tongue 102 and in ladder component 48. The distal end 114 of steering tongue 102 is further coupled to the steering linkage by a bracket 116 (see FIG. 7). In this way, as the steering arm 82 is moved laterally, the steering tongue 102 pivots about rod 112 to pivot the distal end 114 and bracket 116 and impart motion to the steering linkage to steer the wheels 58 if so desired.

As shown in FIGS. 7, 8A and 8B, the steering linkage comprises a group of tie rods which are coupled to the wheels 58 by way of the brackets 70. The steering arm 82 is coupled to the front wheels 58a and 58b by way of tie rods 90 and 92, respectively (along with steering tongue 102, bracket 116, and "C-shaped" brackets 70a and 70b). It will thus be appreciated that movement of the steering arm 82 in one lateral direction or the other will pivot tongue 102 and bracket 116 to exert a tensive or compressive force on the associated tie rods 90, 92. This causes the "C-shaped" brackets 70a, 70b to pivot about pins 72c, 72b, substantially simultaneously pivoting the front wheels 58a and 58b. The rear wheels 58c and 58d are similarly coupled together for substantially synchronous movement by tie rod 94, which is coupled to "C-shaped" brackets 70c and 70d, respectively.

In order to transmit movement from the steering arm 82 to the rear wheels 58c, 58d, tie rods 96, 98, and 100 are provided. Depending upon the configuration in which these tie rods 96, 98, 100 are coupled together, the user may configure the steering linkage to move the dolly 46 in either a conventional, circle steering mode (see FIG. 8A) or a crab steering mode (see FIG. 8B). As may be seen in FIG. 7, tie rods 96, 98, and 100 are coupled to "C-shaped" brackets 70b, 70d, and 70c, respectively.

To steer the dolly 46 in a conventional, circle steering mode, as illustrated in FIGS. 7 and 8A, tie rods 96 and 100 are coupled together by a center pin 97, or the like. When configured in this manner, pivoting of the steering arm 82 clockwise, for example, as shown in FIG. 8A, causes the front wheels 58a, 58b to likewise pivot clockwise as described above. In addition, pivoting of "C-shaped" bracket 70b about pin 72b causes a compressive force to be exerted on tie rods 97/100, causing "C-shaped" bracket 70c to pivot about 72c and pivot rear wheel 58c counter clockwise. In addition, this pivoting or bracket 70c causes a compressive force to be exerted on tie rod 94, causing bracket 70d to pivot about 72d and similarly pivot rear wheel 58d counterclockwise.

Alternately, to steer the dolly 46 in a crab steering mode, as illustrated in FIG. 8B, tie rods 96 and 98 are coupled together by the center pin 97, or the like. When configured in this manner, pivoting of the steering arm clockwise, for example, as shown in FIG. 8b, causes the front wheels 58a, 58b to likewise pivot clockwise, and pivoting bracket 70b to exert a compressive force on tie rod 96/98, causing bracket 70d to pivot clockwise about 72d, and associated rear wheel 58d to pivot clockwise. Pivoting of bracket 70d further causes a compressive force to be exerted on tie rod 94, causing bracket 70c to pivot clockwise about 72c and associated wheel 58c to pivot clockwise.

In order to retain the dolly 46 in a desired location, one or more brakes 120 are provided for the wheels 58. In the preferred embodiment illustrated in FIG. 5, a thumb screw-type brake 120 is provided in the ladder components 48, 50 adjacent each wheel 58. Once in a desired position, the thumb screw brakes 120 may be screwed down to prevent the associated wheels 58 from turning.

To level the dolly 46 in that desired position, levelers 122 are provided. Preferably a leveler 122 is provided substantially adjacent each wheel 58. As illustrated in FIG. 10, a leveler 122 may comprise an enlarged foot 124 coupled to the end of a threaded rod 126. The threaded rod 126 extends through a threaded bore 128 in the ladder component 48, 50. It will be appreciated by those skilled in the art that the levelers 122 may be adjusted to advance the threaded rod 126 through the bore 128 and move the foot 124 to contact the ground, as shown in phantom. Continued movement of the threaded rod 126 and foot 124 ultimately adjusts the vertical position of the associate wheel 58 of the dolly 46. It will further be appreciated that the levelers 122 can also act as stabilizers for the entire crane 30 inasmuch as when the levelers 122 contact the ground, the pneumatic wheels no longer carry the load, so the "springiness" of the tires is minimized or eliminated.

Figure 11:
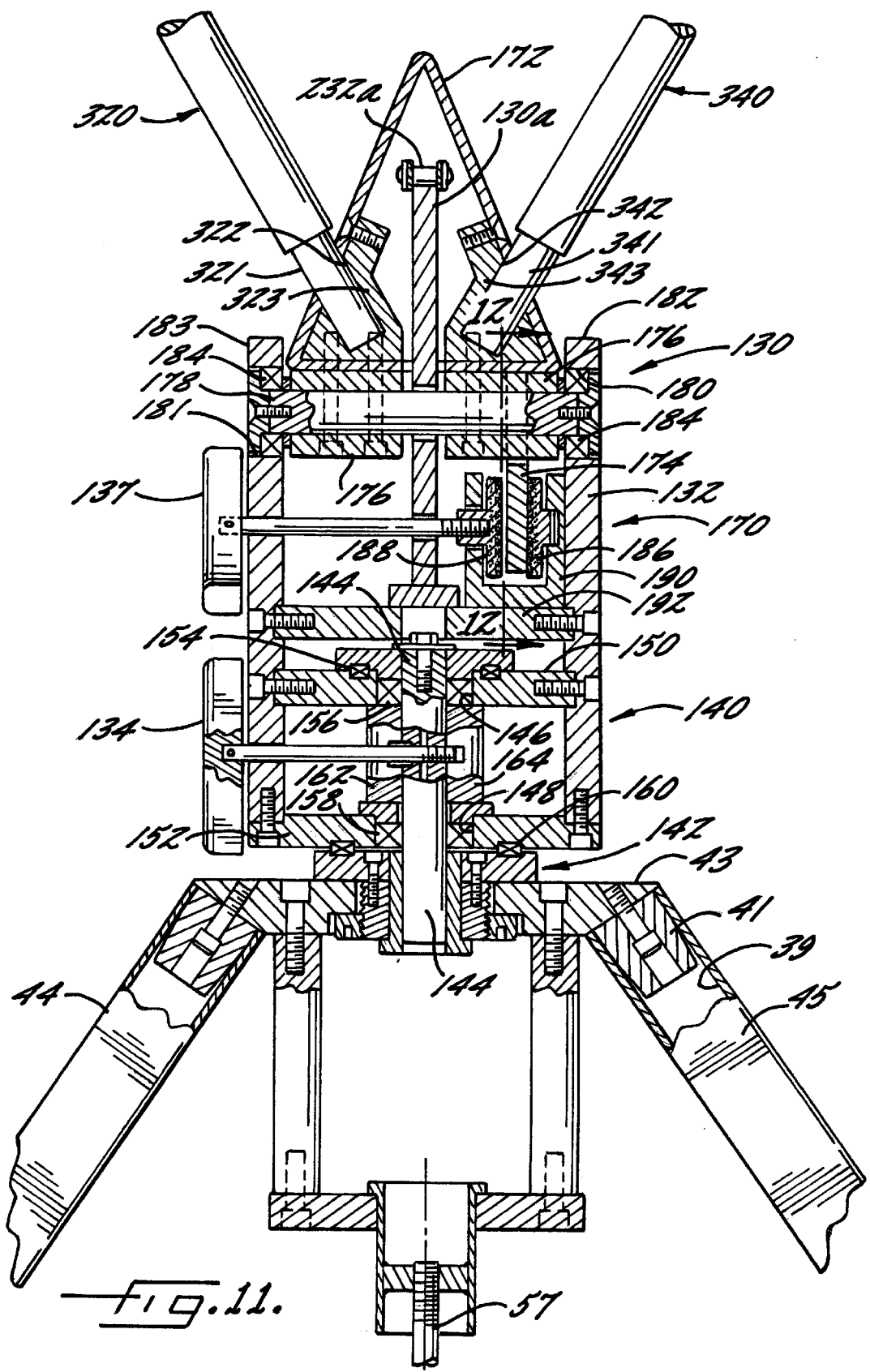
FIG. 11 is a fragmentary, cross-sectional view of the support head taken along line 11—11 in FIG. 4.

Turning now to FIG. 11, in order to impart horizontal and vertical pivotal movement to the camera 32 once the crane base unit 42 is positioned, the boom 34 is coupled to the base unit 42 by a pivot tower 130. The pivot tower 130 includes a housing 132 which houses horizontal and vertical tilt assemblies 140, 170, which may be adjusted by levers 134, 137, respectively. While the panning mechanisms may be described with respect to the illustrated panning assemblies 140, 170, it will be appreciated by those skilled in the art that alternate panning assemblies, such as those disclosed in U.S. Pat. Nos. 2,905,421; 2,998,953; 3,180,603; 3,578,347; and 4,955,568 may as readily be incorporated in the pivot tower 130.

The horizontal pan assembly 140 comprises generally a center shaft assembly 142, which is secured to and extends upward from the quad-pod head 43. The shaft 144 of the shaft assembly 142 extends through openings 146, 148 in horizontal walls 150, 152 of the pivot tower housing 132. In order to ensure that the pivot tower housing 132 rotates smoothly about the shaft 144 and along the shaft assembly 142 relative to the head 43, a series of bearings 154, 156, 158, 160 are provided. In the illustrated design, the pivot tower 130 may rotate 360° relative to the quad-pod 44, the only limiting factor being the length of any power cord coupled to the boom 34 or supported controls In order to retain the pivot tower housing 132 in a desired position relative to the quad-pod 44, brake pads 162, 164 are provided along opposite sides of the shaft 144. Preferably, the brake pads 162, 164 generally conform to the outer annular surface of the shaft 144. As shown in FIG. 11, the brake pads 162, 164 may be adjusted relative to the shaft 144 by rotations of the knob or lever 134 disposed along the outer surface of the pivot tower housing 132 to move them toward or away from one another.

The vertical tilt assembly 170 is disposed generally in the upper portion of the pivot tower housing 132. The central boom section 172 is mounted on the pivot tower housing 132 to be pivotable relative thereto in a vertical plane. In accomplishing this relative pivoting movement, a substantially vertical plate 174 or brake disk is secured to the lower surface of the central boom section 172. The plate 174 is secured to the central boom section 172 by a bracket 176 through which a pivot pin 178 protrudes. As will be appreciated from FIG. 11, the pivot pin 178 is rotatably received in bores 180, 181 in upwardly extending walls 182, 183 of the pivot tower housing 132. To ensure that the resulting vertical tilting movement is smooth, bearings 184 are provided between adjacent surfaces of the pivot pin 178 and the bores 180, 1 81.

As may be seen in FIGS. 11 and 12, in order to maintain the boom 34 in a desired vertical position, the vertical tilt assembly 170 includes a pair of brake pads 186, 188, disposed along either side of the vertical brake disk or plate 174. The brake pads 186, 188 are disposed within a bracket 190 secured to the pivot tower 130 by way of horizontal wall 192. The brake pad 188 may be adjusted relative to brake pad 186 and the brake disc or plate 174 by rotating the knob or lever 137 disposed along the outer surface of the pivot tower housing 132 to move the pad 188 toward or away from pad 186, sandwiching plate 174 to secure or release the vertical pan brake.

Turning now to FIGS. 13–15, the boom 34 is advantageously constructed in sections 200 which are on the order of five (5) feet long (see also FIG. 1). In order to maximize strength, while minimizing the weight of the elongated boom 34, the boom 34 is preferably aluminum extruded in a triangular cross-section. To further minimize weight, openings 202 are cut into the surfaces of the boom sections 200, as shown in FIGS. 1 and 13–15. In the illustrated design, the openings 202 are circular. To maintain maximum strength, the openings 202 are preferably staggered along the three sides of the triangular cross-section. That is, parallel planes disposed perpendicularly to the length of the boom 34 and containing the centerlines of the openings 202 are on the order of one-third the diameter of the opening 202 apart. In this way, a maximum cross-section is maintained at any given corner of the triangular structure (see, for example, FIG. 14).

It will further be appreciated that the openings 202 result in added resistance to movement due to high winds when the crane 30 is used, for example, outdoors. Rather than causing the boom 34 to sway in the wind, the wind essentially passes through the openings 202 in the boom 34.

In order to easily couple sections 200 of the boom 34 together, the ends 204, 206 of the boom sections 200 are provided with a cooperating channel structure. As shown in FIG. 13, a first end of each boom section 200A is provided with female brackets 210, 212 along the "upper" two sides 200a, 200b of the triangular structure 200. The female brackets 210, 212 protrude outward from the end of the boom section 200 and present channels 214, 216 for receiving a mating male structure on the second end of another boom section 200B (as shown in FIG. 14). A protruding male bracket 218 is further provided along the inside surface of the "lower," third side of the first end of the boom section 200A, as shown in FIG. 13. Each of the brackets 210, 212, 218 is preferably held in position in the boom section 200A by bolts 219 (as shown), welding, or the like. Alternately, the brackets may be integrally formed with the boom section.

The opposite end of each boom section 200 is provided with mating male and female structures. More specifically, as shown in FIG. 14, the inside surfaces of the "upper"two sides 220d, 200e of the second end of each boom section 200B are provided with protruding male brackets 220, 222.

The "lower," third side of the second end is provided with a female bracket 228, which presents a channel 226. As with the opposite end of the section 200, the brackets 220, 222, 228 are secured to the boom section 200B by held in place by bolts 229 (as shown), welding, or the like. Again, alternately, the brackets may be integrally formed with the boom section.

As shown in FIG. 15, during assembly, section 200B slides down along section 200A, channels 214, 216 receiving male brackets 220, 222 of the "upper" two sides 220a, 220b, 220d, 220e . As seen most clearly in FIG. 16A, the distal surface 214a, 216a, 226a of the channels 214, 216, 226 of the female brackets 212, 214, 228 preferably have a taper of approximately 5° or the like to vertical. This slight tapering facilitates the coupling and seating of the respective male and female components.

Once seated, the channel 226 receives the male bracket 218, as shown in FIG. 16B. While the mere weight of the section 200B in conjunction with the male/female bracket design would be sufficient to maintain the respective sections 200A, 200B in position, further mechanical coupling is preferably provided. In the preferred embodiment, the joint is further secured by a bolt 230, as shown in FIG. 16B, which may be in the form of a knob and screw.

While the invention has been described with respect to boom sections having a triangular cross-section, it will be appreciated that an alternate cross-sectional design may be provided. For example, as a trapezoidal or rectangular cross-section may be provided. So long as the opposed vertical or upper walls are configured with a vertical component and taper at least somewhat toward one another at the top, the weight of gravity will facilitate sliding the sections together and maintaining the relative positions.

As seen in FIG. 2, in order to couple a camera 32 to the boom 34, the distal end 36 of the boom 34 is provided with a nose assembly 240 which supports a head 242, which further supports the camera 32. The head 242 is coupled to the distal element 244 of the nose assembly 240. The nose assembly 240 is hinged to the distal end 36 of the boom 34. The significance of the shape of the nose assembly 240 will be explained below with regard to the balancing of the crane 30

According to one feature of the invention, the nose assembly 240 may be manipulated to maintain the distal element 244 of the nose assembly 240 and, accordingly, the head 242 in a substantially horizontal plane. To this end, an elongated tensioning device 232 may be provided as shown in FIGS. 2, 19A, and 19B. It will be appreciated that the elongated tensioning device 232 may be of an appropriate material that is substantially resistant to stretching or further elongation, such as a cable, rod, or chain. For ease of explanation, the tensioning device 232 will be referred to as a tension rod 232. The term tension rod as used both in the specification and claims, however, is intended to refer to such a tensioning device which resists further elongation. The tension rod 232 preferably runs the entire length of the boom 34 and coupled together by quick disconnects 234 (such as those illustrated in FIG. 21) at each section 200, and is supported within each section 200 by guide brackets 231 and a bushing 231a (see FIG. 20). Flexible elongated components 232a, 232b are coupled to the proximal and distal ends of the tension rod 232 as shown in FIG. 21. Similarly, while the term chain will be used in the specification and claims when referring to the flexible elongated components 232a, 232b at opposite ends of the tension rod 232, the term is intended to encompass all such elongated components that are sufficiently flexible, yet substantially resistant to further elongation, including components such as cables. The chain 232a at the proximal end of the tension rod 232 is secured to the pivot tower 130 and extends over an arcuate structure 130a disposed within the tower 130 (as shown in FIGS. 11, 19A, and 19B). The chain 232b at distal end of the tension rod 232 is secured to the element 245 of the nose assembly 240 (which is in turn secured to the distal element 244), and extends over a second arcuate structure 233, which is likewise secured to the element 245 (as shown in FIGS. 2, 19A, and 19B). The chains 232a, 232b may be coupled to the pivot tower 130 and nose assembly 240 by any appropriate method. Preferably the chains 232a, 232b are coupled directly to the respective arcuate structures 231, 233 by a pin or bolt, as illustrated in FIGS. 19A and 19B. It will be appreciated that as the element 245 hinges toward the boom 34 in a counterclockwise direction, the nose arcuate structure 233 may pass through an opening in the "lower-"wall 200g of the boom section 200.

It will further be appreciated by those skilled in the art that the tension chain/rod 232, the boom 34, and the element 245 form a parallelogram for supporting the nose assembly 240. As the boom 34 is rotated counterclockwise to raise the nose 240, the tension rod 232 slides axially within the boom structure, but remains parallel to and at a given distance from the walls of the boom 34. In order to provide a smooth movement to the nose assembly 240, a dual acting shock absorber 246 is further provided. It will be appreciated while the tension cable/rod assembly maintains the front nose assembly 240 in a substantially horizontal position, the shock absorber 246 ensures that the movement of the nose assembly 240 will be a smooth as possible. Thus, the given tension rod balancing design yields a optimal, lightweight counterbalancing design. Additionally, it provides a clean, uncluttered appearance to the crane itself.

The head 242 is substantially "C-shaped." The upper leg 242a of the head 242 is coupled to the distal element 244 of the nose assembly 240 such that it may rotate about a pan axis 247 to adjust the horizontal direction of the camera 32. The pan coupling 248 may be of any appropriate structure and is preferably controlled by the user from the user controls 38 disposed at the proximal end 40 of the boom 34.

The camera 32 is supported by the lower leg 242c of the head 242 at 248. Importantly, the camera 32 is disposed along the pan axis 247. In order to adjust the height of the center of gravity of the camera 32 (the significance of which will become apparent with further description of the preferred embodiment), the lower leg 242c is preferably moveable relative to the vertical and upper legs 242a, 242b of the head 242. In the preferred embodiment illustrated, the lower leg 242c may be adjusted by a simple screw mechanism 250 or the like.

According to an additional feature of the invention, the camera 32 may further rotate about a horizontal tilt axis 252. As illustrated in FIG. 3, this coupling may be accomplished by controls known in the art.

Turning now to FIG. 4, the tail section 260 of the boom 34 is coupled to the central boom section 172 in the same manner as described above with regard to the coupling of sections 200A and 200B of the boom 34 (see FIGS. 13–16B). A tray 262 for supporting a monitor (not shown) is provided at the proximal end of the tail section 260. In order to provide the operator with optimum view of the monitor, the tray 262 is pivotably coupled to the tail section 260. The monitor tray 262 is supported on an "h-shaped" stand 266 (best seen in FIG. 17) having an elongated post 268 which supports the tray 262 and an outwardly and downwardly extending arm 270, which extend outwardly and downwardly from the post 268. The upper edge of the tail section 260 has an opening in which a bracket 264 is disposed. The bracket 264 includes a central opening which loosely receives the elongated post 268 supporting the tray 262. The post 268 is pivotably coupled to the bracket 264 by a pin 272 or the like such that the tray 262 may pivot relative to the central boom section 172, and the user.

In order to cause the tray 262 to pivot and preferably remain horizontal as the proximal end of the boom 34 is moved upward, or downward, a pivot control rod 274 is provided. The pivot control arm 274 is disposed along side the boom tail section 260 and is pivotably coupled at its distal end to the pivot tower housing 132 by any appropriate coupling. The proximal end of the pivot control arm 274 is pivotably coupled to the stand arm 270 by a pin 276, or the like. It will thus be appreciated that, during operation, as the tail section 260 of the boom 34 pivots in the upward direction, that is, clockwise in the view shown in FIG. 4, the pivot control arm 274 will cause the tray 262 to pivot in a counterclockwise direction about pin 272 so that the monitor will tilt downwards toward the user. Conversely, as the tail section 260 of the boom 34 pivots in the downward direction, that is, counterclockwise in the view shown in FIG. 4, the pivot control arm 274 will cause the tray 262 to pivot in a clockwise direction about pin 272 so that the monitor will tilt upwards toward the user. This will ensure that the monitor tray 262 will maintain the same angular attitude (horizontal or not) while the boom 34 is moved up or down.

The pivot control arm 274 may further be provided with a feature by which the "zeroed" position of the tray 262 may be adjusted for added comfort to the user. As shown in FIG. 4, the zeroing position of the tray 262 may be adjusted by loosening clamp 278 along the pivot control arm 272, telescoping the pivot control arm 272 to adjust the length, and again tightening the clamp 278. The clamp 278 may be of any known design.

Turning now to the control tail 290, which is located at the proximal end 40 of the boom 34, the user controls 38 may include any desired components, such as a script board 280, joystick 282, and zoom and focus controls 284. Preferably, the control tail further comprises a pair of handles 286 by which the user may maneuver the boom 34 and/or control the camera 32 mounted at the opposite end of the boom 34.

In order to couple the controls to the boom 34, the control tail 290 includes a triangular male/female coupling similar to that described above with regard to the boom sections 200 (see FIG. 17). Accordingly, the control tail 290 may be mounted directly to the boom tail section 260. Alternately, and in particular, if the base unit 42 is disposed upon an elevated platform or the like (not shown), the control tail 290 may be coupled to the boom tail section 260 by a balcony 292. The balcony 292 is so named because it would generally be utilized when the crane 30 is located in the balcony of an auditorium, well above the area that is to be seen by the camera. In such a setting, the distal end 36 of the crane 30 can be lowered below the level of the crane dolly 46, such that the proximal end 40 is elevated. The balcony 292 is used in this instance to lower the control tail 290 to an elevation more comfortable to the operator.

The balcony 292 includes male/female brackets 294, 296 similar to those disposed at the ends of the boom sections 200 (and as explained with regard to FIGS. 13–16B). The brackets 294, 296 are slidably coupled together rods 298 which may be secured at locking plates 294a to secure the relative positions of the brackets 294, 296. In this way, the control tail 290 may be coupled to the boom 34 by way of the adjustable balcony. It will thus be appreciated that the control tail 290 may be adjusted upwards or downwards relative to the boom 34, providing added comfort to the operator during use.

Power may be supplied to the controls and monitor by any appropriate source. Conveniently, a housing containing the hard drive a computer (not shown) may be mounted to the boom tail section 260.

In order to counterbalance the camera 32, head 242, nose assembly 240, and elongated portion of the boom 34 extending distally from the pivot tower 130, a counterbalance weight 300 is provided. The counterbalance weight 300 is coupled to the boom tail section 260 by a rod 302 which extends through the weight 300 and openings 304 in non-articulated arms 306 extending downwardly from the tail section 260.

Importantly, inasmuch as the head 242 is maintained in a substantially horizontal position over the range of movement of the boom 34, once the crane 30 is initially balanced, the crane 30 will remain balanced when the boom 34 is moved to a new position. In order to determine the desired location of the counterbalance weight 30, a determination is first made of the location of the center of gravity of the combined boom sections 200 distal or forward the pivot tower 130, the nose 240, the camera head 242, and the camera 32. The nose assembly 240 is preferably shaped as illustrated in order to bring the center of gravity of the combined assembly of nose, head, and camera in line with the center of the boom sections 200, hence reducing the potential "pendulum effect" that may arise when the crane arm is swung horizontally and accelerated or decelerated during started and stopping the swing action. An imaginary line is then drawn through that calculated center of gravity and pivot of the boom 34 (that is, the pivot pin 178). The counterbalance weight 30 is located such that the center of gravity of the boom assembly proximal or rearward the pivot tower 130, including the rearward boom section 260, the user controls 38, the platform 262, the hard drive computer, the monitor, and the counterbalance weight 30 is disposed along that imaginary line. The determinations of the physical locations of the centers of gravity are made by conventional engineering calculation techniques known to those skilled in the art.

In order to further support the elongated boom 34, a cable support assembly 310 is provided, as shown in FIGS. 1, 4, 18A and 18B. The cable support structure comprises "rabbit-ear" support arms 320, 340 and a series of cables coupled thereto. The support arms 320, 340 are coupled to the central boom section 172 as shown in FIGS. 4 and 11. The proximal ends 321, 341 of the respective arms 320, 340 are received into bores 322, 342 in the central boom section 172 and subjacent brackets 323, 343, respectively. While the following explanation is provided with respect one of the arms 320, the explanation is likewise applicable to arm 340.

In order to provide a cable support assembly 310 that may be easily assembled and coupled to the boom 34, the support arm 320 is preferably an articulated design. The support arm 320 preferably includes three elongated components 324a, b, c, the proximal end of component 324a being received into the central boom section 172. Components 324b and c, 344b and c are preferably secured relative to one another in bracket 325, the bracket 325 being pivotably coupled to component 324a by a pin 326. The significance of this hinged structure will be explained below.

One end of each of the support cables 327 is coupled to the arm component 324b by a pivotable coupling. In the preferred design illustrated, a rod 328 extends coaxially outward from the arm component 324b. A flag 329 is pivotably coupled to the rod 328 by way of flanges 330, 331. A rearward support cable 327a is pivotably coupled to the flag 329 by a preferably fork and pin coupling 329a. Forward support cables 327b are coupled to the rod 328 by way of a plurality of pivotable couplings 332. Each of the flanges 330, 331 and pivotable couplings 332 are further maintained on the rod 328 by an enlarged head 333. In an alternate design, the flag 329 includes a forward facing extension to which the forward support cables may be disconnectably coupled.

During assembly, the arms 320, 340 are inserted into the central boom section 172 as explained above. The cables 327 are subsequently coupled to the boom 34 at appropriate locations. The rearward support cables 327a is pivotably coupled to the tail boom section 260 at pins 334. Any slack in the rearward support cables 327a may be adjusted by way of a clamp 334a, which is slidably disposed to surround a portion of the rearward support cables 327a and draw them toward one another. The forward support cables 327b are similarly coupled to the boom by any appropriate method. In the preferred design, the forward support cables 327b are coupled by way of brackets which engage the openings 202 in the boom 34.

Figure 18A:
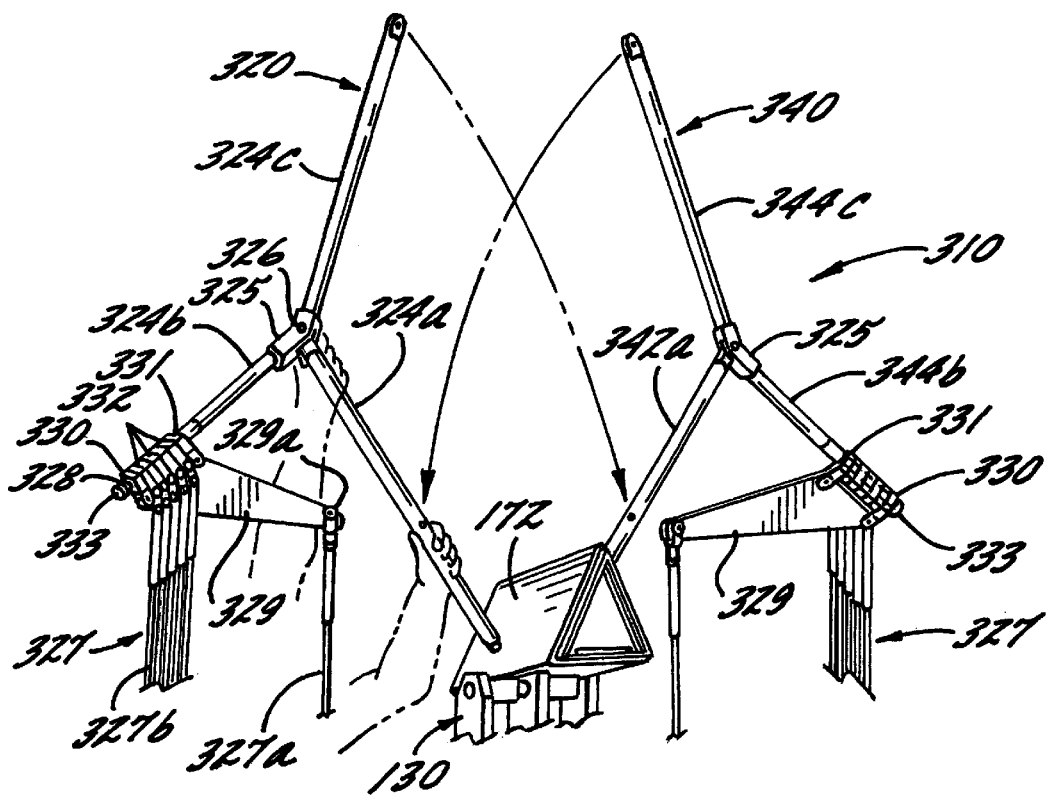
FIG. 18A is a fragmentary view of the cable support arms and central boom section shown in FIG. 1 shown in a partially assembled position.
Figure 18B:
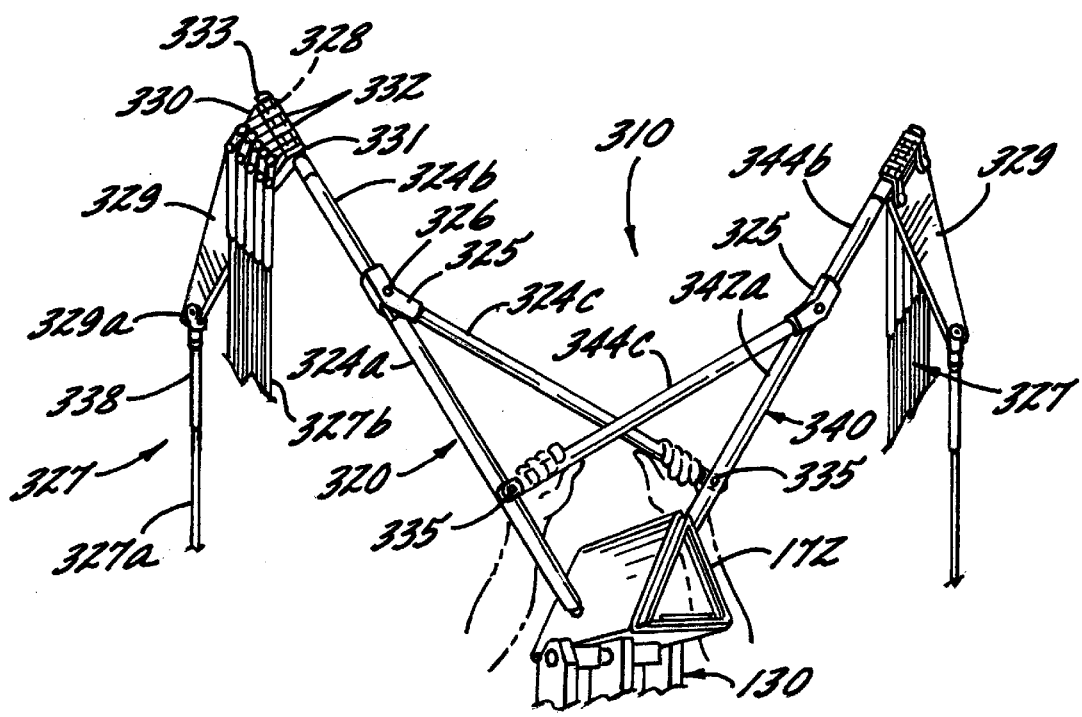
FIG. 18B is an enlarged, fragmentary, exploded view of the cable support arms and central boom section shown in FIG. 18A during assembly.

Again, describing the support arms 320, 340 with regard to arm 320, once the cables 327 are coupled to the boom 34, the components 324b and 324c may pivoted inward toward the central boom section 172, as illustrated in FIG. 18B, to bring component 324b in line with component 324a, as shown in FIG. 18A. The distal end of component 324c may then be secured to component 342a by a pin 335 or the like to provide a rigid "rabbit-ear" type of design. Preferably, in order to provide maximum strength to the structure, component 324c extends outward from component 342a at a right angle. It will be appreciated by those skilled in the art that in the position shown in FIG. 18B, the operator may easily assemble and work with the cables 327 and their attachment to the rod 328. Further, as the arm components 324b, c are pivoted to the final position shown in FIG. 18A, the cables 327 are tensioned. In order to provide additional tension control to the rearward cables 327a, a sliding adjustment bracket 338 is provided to eliminate slack.

To provide further lateral support for the boom 34, lateral stays 360 are provided along either side of the boom 34, as shown in FIGS. 1, 4, 5, and 22. The proximal end of the cable 364 is coupled directly to the proximal end 40 of the boom 34, and the distal end of the cable 364 is coupled directly to the distal end 36 of the boom 34 by any appropriate coupling device. As may be seen in FIG. 1, lateral braces 362 extend lateral outward from the boom 34 to support lateral support cables 364 along the length of the boom 34. As shown in the enlarged fragmentary view of the lateral brace 362 shown in FIG. 22, a wheel 366 rotatably disposed at the distal end of the brace 362 includes a concave outer peripheral surface 368, which supports the cable 364. In this way, the lateral stays 360 are dynamic in that the cable 364 may move along the wheels 366 to equalize the lateral support.

In summary, the invention provides a crane for supporting a camera, which may be easily assembled and disassembled by the user. The crane is relatively lightweight and resistant to the wind. Moreover, once the crane is balanced, it may be moved to substantially any position and it will maintain that position with minimal or no sliding movement.

We claim as our invention:

1. An instrument supporting crane for supporting a video camera or the like, the crane comprising:
    a boom having a distal end and a proximal end, the boom having a wall and a hollow interior, the wall having a plurality of openings extending therethrough to the hollow interior such that the openings allow the passage of air through the hollow interior, the wall having a periphery, the openings being staggered about the periphery,
    a base unit, the boom being pivotably coupled to the base unit,
    a nose assembly for supporting the video camera or the like, said nose assembly being coupled to the distal end of the boom.

2. The instrument supporting crane of claim 1 wherein the wall has an upper portion and a lower portion, the openings being disposed at least along the upper portion.

3. The instrument supporting crane of claim 1 wherein the boom comprises a cross-section having opposed upper wall portions, and said upper wall portions taper towards one another.

4. The instrument supporting crane of claim 3 wherein the boom has a substantially triangular cross-section.

5. The instrument supporting crane of claim 1 wherein the boom has at least a first section and a second section, each said section having a proximal end and a distal end, the proximal end of the first section and the distal end of the second section being coupled together to form the boom.

6. The instrument supporting crane of claim 5 wherein the proximal end of the first section and the distal end of the second section have complementary channels whereby the first and second sections may be slid together to couple the first and second sections to form the boom.

7. The instrument supporting crane of claim 1 further comprising an elongated tension rod assembly coupled to the nose assembly and to the base unit.

8. The instrument supporting crane of claim 1 further comprising a cable support assembly having a plurality of cables coupled to the boom toward the proximal end of the boom and along the length of the boom toward the distal end of the boom.

9. The instrument supporting crane of claim 1 wherein the base unit comprises a head, a plurality of legs, and a dolly, the plurality of legs being coupled to the head and to the dolly, at least one of said legs having an opening extending therethrough such that the leg opening allows the passage of air therethrough.

10. The instrument supporting crane of claim 9 wherein each leg comprises a plurality of openings therethrough.

11. The instrument supporting crane of claim 1 further comprising a boom tail section extending axially from the proximal end of the boom, and a counterweight coupled to the boom tail section.

12. The instrument supporting crane of claim 11 further comprising a platform assembly coupled to the boom tail section, the platform assembly having a monitor tray for supporting a monitor and a stand secured to the monitor tray, the stand being pivotably coupled to the boom tail section and pivotably coupled to the base unit such that movement of the boom tail section relative to the base unit pivots the monitor tray relative to the boom tail section.

13. An instrument supporting crane for supporting a video camera or the like, the crane comprising,
    a boom having a boom distal end and a boom proximal end, the boom having a longitudinal axis and at least a first section and a second section, each said section having a proximal end and a distal end, the proximal end of the first section and the distal end of the second section having complementary channels disposed in a plane at an angle to said longitudinal axis, whereby the first and second sections may be slid together to axially couple the first and second sections to form the boom, a base unit the boom being pivotably coupled to the base unit, a nose assembly for supporting the video camera or the like, said nose assembly being coupled to the distal end of the boom.

14. The instrument supporting crane of claim 13 further comprising an elongated tension rod assembly coupled to the nose assembly and to the base assembly.

15. The instrument supporting crane of claim 14 wherein the elongated tension rod assembly comprises a tension rod and two chains, the chains being disposed at either end of the tension rod.

16. The instrument supporting crane of claim 14 further comprising a first arcuate element coupled to base assembly, and a second arcuate element coupled to the nose assembly, the tension rod assembly extending over the arcuate elements.

17. The instrument supporting crane of claim 16 wherein the elongated tension rod assembly comprises a tension rod and two chains, the chains being disposed at either end of the tension rod and extending over the arcuate elements, the first arcuate element being secured to the base assembly and the second arcuate element being secured to the nose assembly whereby as the boom pivots relative to the base assembly the tension rod moves axially relative to the boom such that the tension rod remains substantially parallel to and equidistant from the boom wall.

18. The instrument supporting crane of claim 13 wherein the boom sections comprise a cross-section having opposed upper wall portions, and said upper wall portions taper towards one another.

19. The instrument supporting crane of claim 18 wherein the upper wall portions comprise the complementary channels.

20. The instrument supporting crane of claim 18 wherein the boom sections have a substantially triangular cross-section.

21. The instrument supporting crane of claim 18 wherein the boom sections have a substantially rectangular cross-section.

22. The instrument supporting crane of claim 18 wherein the boom sections have a substantially trapezoidal cross-section.

23. The instrument supporting crane of claim 18 further comprising a mechanical coupling, the mechanical coupling further securing the boom sections together.

24. The instrument supporting crane of claim 23 wherein the mechanical coupling is a screw.

25. The instrument supporting crane of claim 13 further comprising a cable support assembly having a plurality of cables coupled to the boom toward the proximal end of the boom and along the length of the boom toward the distal end of the boom.

26. The instrument supporting crane of claim 25 wherein the cable support assembly further comprises at least one arm extending outward from an upper surface of the boom toward the proximal end of the boom, the cables being coupled to the arms.

27. The instrument supporting crane of claim 26 wherein the arm comprises a distal end, and the cable support assembly further comprises an elongated flag assembly coupled to the distal end, the cables being coupled to the flag.

28. The instrument supporting crane of claim 26 further comprising a boom tail section extending axially from the proximal end of the boom, and the cable support assembly further comprises a tail section cable coupled to the arm and the tail section.

29. The instrument supporting crane of claim 13 wherein the base unit comprises a head, a plurality of legs, a dolly, and a center tie down rod, the plurality of legs being removably coupled to the head and to the dolly, the center tie down rod being axially lengthenable and extending between the head and the dolly whereby shortening the tie down rod results in a compressive force on the legs.

30. The instrument supporting crane of claim 29 wherein the base unit further comprises a plurality of bore and pin assemblies, the legs being coupled to at least one of the head or the dolly by said bore and pin assemblies.

31. The instrument supporting crane of claim 30 wherein the bore and pin assemblies comprise an axially-extending bore within the leg and a pin coupled to at least one of the head or the dolly, the pin being received in the bore to couple the leg to the head or dolly.

32. The instrument supporting crane of claim 13 further comprising a boom tail section extending axially from the proximal end of the boom, and a counterweight coupled to the boom tail section.

33. The instrument supporting crane of claim 32 further comprising a platform assembly coupled to the boom tail section, the platform assembly having a monitor tray for supporting a monitor and a stand secured to the monitor tray, the stand being pivotably coupled to the boom tail section and pivotably coupled to the base unit such that movement of the boom tail section relative to the base unit pivots the monitor tray relative to the boom tail section.

34. The instrument supporting crane of claim 13, wherein the boom has a wall and a hollow interior, the wall having a plurality of openings extending therethrough to the hollow interior such that the openings allow the passage of air through the hollow interior.

35. An instrument supporting crane for supporting a video camera or the like, the crane comprising, a boom having a boom distal end and a boom proximal end, a base unit, the boom being pivotably coupled to the base unit, a nose assembly for supporting the video camera or the like, said nose assembly being coupled to the distal end of the boom, an elongated tension rod assembly coupled to the base unit and to the nose assembly, said tension rod assembly including an elongated central portion having ends, a first flexible portion disposed at one end of the elongated central portion and a second flexible portion disposed at the other end of the elongated central portion, a first arcuate element secured to the base assembly and having a periphery, and a second arcuate element secured to the nose assembly and having a periphery, the first flexible portion being secured to at least one of the base assembly or the first arcuate element and adapted to extend over and contact at least a portion of the periphery of the fit arcuate element, the second flexible portion being secured to at least one of the nose assembly or the second arcuate element and adapted to extend over and contact at least a portion of the periphery of the second arcuate element whereby the nose assembly may be substantially maintained in a desired position as the boom pivots relative to the base unit.

36. The instrument supporting crane of claim 35 wherein the elongated tension rod assembly comprises a tension rod and two chains, the chains being disposed at either end of the tension rod and extending over the arcuate elements, whereby as the boom pivots relative to the base assembly the tension rod moves axially relative to the boom such that the tension rod remains substantially parallel to and equidistant from the boom wall.

37. The instrument supporting crane of claim 36 wherein the chains are coupled to the tension rod by quick-disconnects.

38. The instrument supporting crane of claim 35, wherein the boom has a wall and a hollow interior, the wall having a plurality of openings extending therethrough to the hollow interior such that the openings allow the passage of air through the hollow interior.

39. An instrument supporting crane for supporting a video camera or the like, the crane comprising, a boom having a boom distal end and a boom proximal end, a nose assembly for supporting the video camera or the like, said nose assembly being coupled to the distal end of the boom, a base unit, the boom being pivotably coupled to the base unit, the base unit comprising a head, a plurality of legs, a dolly, and a center tie down rod, the plurality of legs extending between the head and the dolly and being removably coupled to the head and to the dolly, the center tie down rod being axially lengthenable and extending between the head and the dolly whereby shortening the tie down rod results in a compressive force on the legs.

40. The instrument supporting crane of claim 39 wherein the base unit further comprises a plurality of bore and pin assemblies, the legs being coupled to at least one of the head or the dolly by said bore and pin assemblies.

41. The instrument supporting crane of claim 40 wherein the bore and pin assemblies comprise an axially-tending bore within the leg and a pin coupled to at least one of the head or the dolly, the pin being received in the bore to couple the leg to the head or dolly.

42. The instrument supporting crane of claim 39, wherein the boom has a wall and a hollow interior, the wall having a plurality of openings extending therethrough to the hollow interior such that the openings allow the passage of air through the hollow interior.

* * * * *

UNITED STATES PATENT AND TRADEMARK OFFICE
CERTIFICATE OF CORRECTION

PATENT NO.   : 6,478,427 B1
DATED        : November 12, 2002
INVENTOR(S)  : Morris et al.

It is certified that error appears in the above-identified patent and that said Letters Patent is hereby corrected as shown below:

<u>Column 1,</u>
Line 3, "60/127,588" should read -- 60/127,533 --.

<u>Column 8,</u>
Line 11, "1 81" should read -- 181 --.

Signed and Sealed this

Eighth Day of April, 2003

JAMES E. ROGAN
*Director of the United States Patent and Trademark Office*